Figure 1:
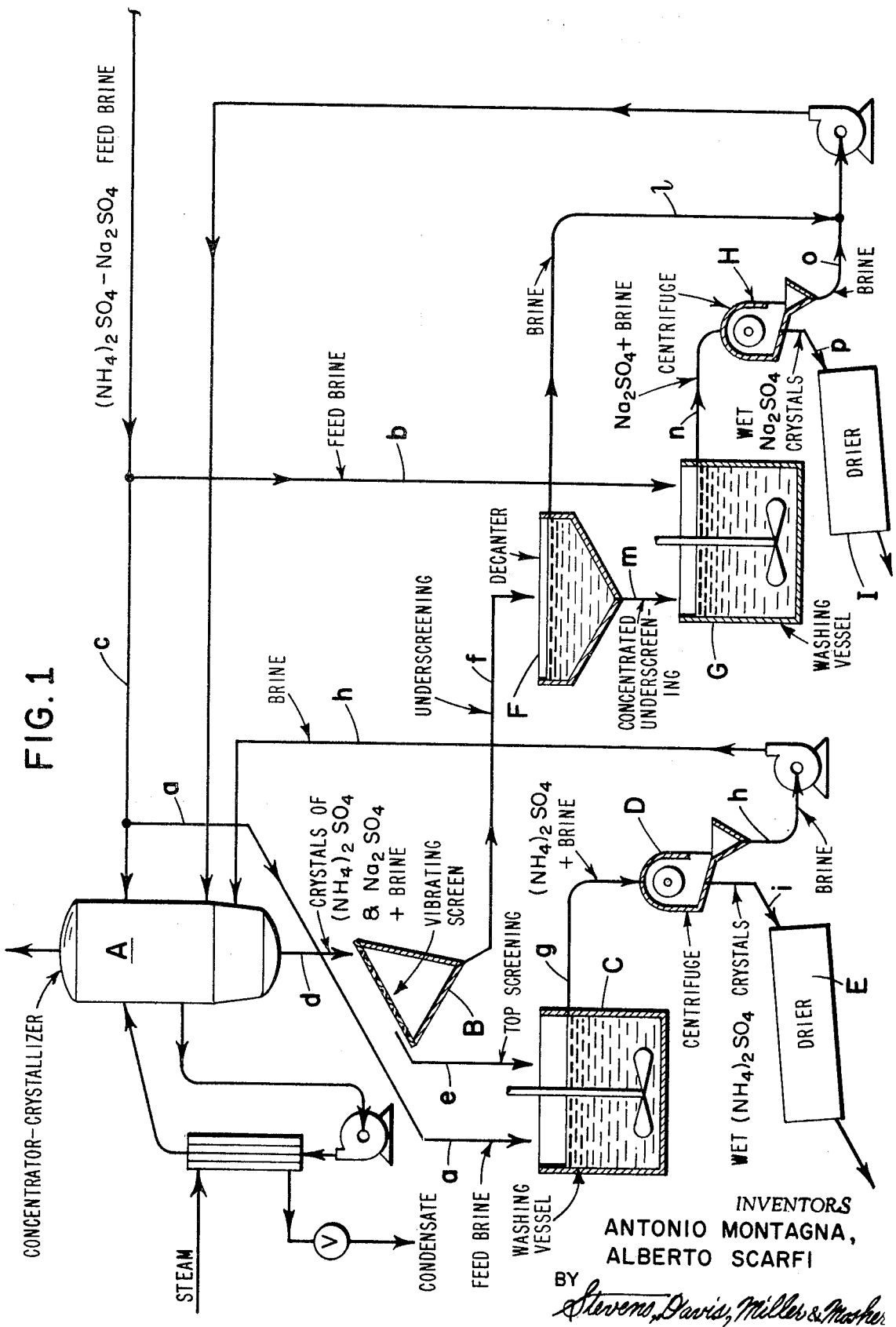
Figure 2:
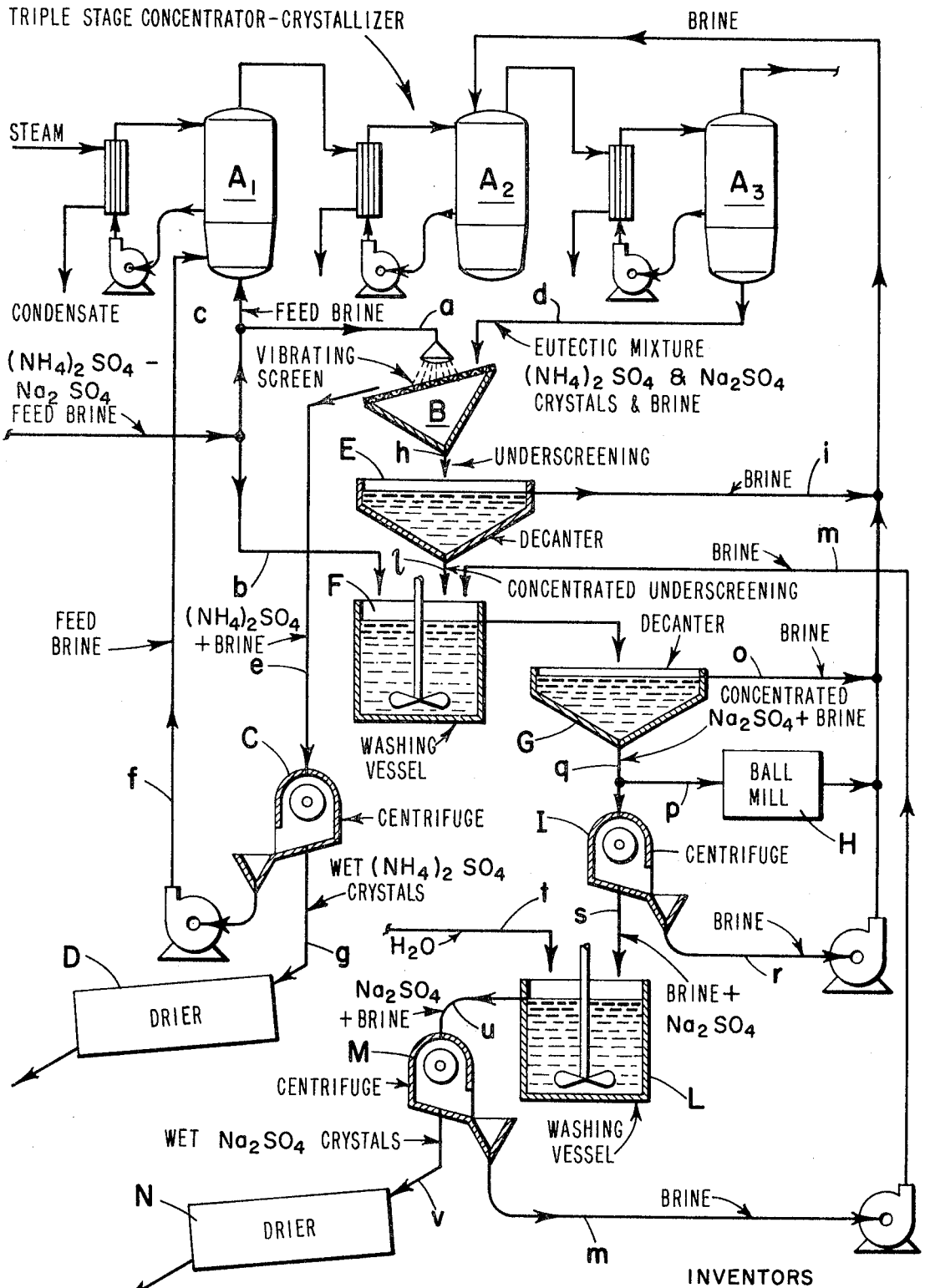

United States Patent

[11] 3,607,141

[72] Inventors: Antonio Montagna, Mestre, Venezia; Alberto Scarfi, Siracusa, both of Italy
[21] Appl. No.: 824,729
[22] Filed: Apr. 29, 1969
[45] Patented: Sept. 21, 1971
[73] Assignee: Societa' Edison, Milan, Italy
[32] Priority: Oct. 6, 1964
[33] Italy
[31] 21642/64
Continuation of application Ser. No. 493,100, Oct. 5, 1965, now abandoned.

[54] PROCESS FOR THE RECOVERY AND FOR THE SEPARATION OF PURE SODIUM SULFATE AND PURE AMMONIUM SULFATE FROM AQUEOUS SOLUTIONS THEREOF
8 Claims, 2 Drawing Figs.

[52] U.S. Cl. .................................................. 23/301, 23/120, 23/121, 23/302
[51] Int. Cl. .................................................. C01c 1/24, C01d 5/00
[50] Field of Search .................................................. 23/302, 300, 119, 120, 121

[56] References Cited
UNITED STATES PATENTS

| | | | |
|---|---|---|---|
| 1,332,419 | 3/1920 | Vis | 23/119 |
| 1,364,822 | 1/1921 | Vis | 23/119 |
| 1,366,301 | 1/1921 | Vis | 23/119 |
| 1,366,302 | 1/1921 | Vis | 23/119 |
| 2,739,044 | 3/1956 | Ashley | 23/302 |

Primary Examiner—Norman Yudkoff
Assistant Examiner—S. Silverberg
Attorney—Stevens, Davis, Miller and Mosher ABSTRACT: Finely ground $Na_2SO_4$ seed crystals are introduced to an aqueous solution which is concentrated at a temperature greater than 60° C. to produce a first fraction consisting of ammonium sulfate with a minor amount of sodium sulfate, and a second fraction consisting of a predominant amount of sodium sulfate with a minor amount of ammonium sulfate. The respective fractions are then washed to reduce the sulfate in minor amount.

PROCESS FOR THE RECOVERY AND FOR THE SEPARATION OF PURE SODIUM SULFATE AND PURE AMMONIUM SULFATE FROM AQUEOUS SOLUTIONS THEREOF

This is a continuation of application Ser. No. 493,100 filed Oct. 5, 1965, now abandoned.

T.. present invention relates to a process for the recovery and for the separation of pure ammonium sulfate and pure sodium sulfate from aqueous solutions thereof.

It is known that various industrial processes yield aqueous solutions of ammonium sulfate and sodium sulfate in varying ratios, from which it would be highly desirable to recover these two salts separately in a pure state.

The separation and recovery of these two pure salts from a solution thereof via conventional separation methods for salts in solution, e.g. fractional crystallization, are complicated because of the coprecipitation of the double salt, $Na_2SO_4 \cdot (NH_4)_2SOB4.4H_2O$. and therefore, in order to avoid expensive operations with extraordinary recycles bring necessary, necessity of maintaining strictly constant operating conditions such as temperature and mass action, equipment complexity, repeated cooling and heating, etc., one often merely refrains from the practice of separating the two salts and simple discharges such aqueous solutions to waste.

For example in the preparation of caprolactam by treating cyclohexanone with hydroxylamine sulfate prepared from sodium nitrite, $SO_2$ and $NH_3$, there is obtained a mother liquor containing sodium sulfate ad ammonium sulfate in solution (corresponding to about 11 percent sodium sulfate, 27 percent ammonium sulfate and 62 percent water) which, according to usual methods affords upon concentration a saline product having a medium titre of 15–16 percent nitrogen.

The product thus obtained is of little interest not only because it is impure, but because it is a mixture of salts and is of little value as fertilizer, having a high percentage of sodium sulfate. The presence of agglomerates of varying sizes and predominantly conposed of a double salt that is readily formed when small percentage of water are present in the product, leads to a discontinuous titre and, therefore, to an irregular product.

Accordingly, it is an object of the present invention to provide a simple and economical process for the recovery and separation of pure sodium sulfate and pure ammonium sulfate from aqueous solutions thereof.

It has now been surprisingly found, according to the present invention, that by crystallizing aqueous solutions containing both sodium sulfate and ammonium sulfate through evaporation at temperatures higher than 60° C. at any given concentration, one can precipitate a product consisting of a mixture of ammonium sulfate and sodium sulfate crystals with clearly different physical characteristics (size and density), and which can be separated by screening or other suitable classification method into two crystalline fractions consisting essentially of ammonium sulfate and sodium sulfate, respectively, which, when separately washed, always at temperatures above 60° C., yield the two salts in a practically pure state.

Therefore, the process according to the present invention consist essentially of the following phases:

a. concentration through evaporation at temperatures greater than 60° C. of the solution containing the two salts with concomitant precipitation of a mixture of ammonium sulfate crystals having a size of 0.5–1 mm., specific gravity of 1.7–1.8, and of sodium sulfate crystals with a size of less than 0.3 mm. and a specific gravity of about 2.7;

b. separation via suitable methods (dry or wet screening, ventilation, concentration in liquid phase, separation with heavy liquids, flotation, etc.) of two crystalline fractions, one predominantly ammonium sulfate the other sodium sulfate, exploiting the different granulometric and/or density characteristics of the crystals of the two salts;

c. separately washing the two fractions thus obtained with water or with an unsaturated aqueous solution of the two salts or with a fraction of the starting brine at temperatures higher than 60° C.: in this phase, for each fraction, the salt present in the lesser quantity, and part of the other, entirely pass into solution, thereby leaving behind only pure salts; and d. recovery of the pure salts, for example by centrifugation or filtration, ultimate washing and drying, and thence recycling the mother liquor and washing waters back into the concentration phase.

Both during the concentration through evaporation of the initial liquorous solutions, as well as in all other operations in the wet state which are carried out in the presence of the two salts such as screening, concentration by decantation, centrifugation or filtration and washing, the temperature is always maintained above 60° C. in order to avoid formation of the double salt, sodium sulfate-ammonium sulfate.

The crystallization of the two salts through evaporation of the solution in which they are contained is carried out in a concentrator-crystallizer of single or multiple stage and operating at temperatures higher than 60° C., preferably at temperatures between 65° and 100° C. for concentrators of single stage and at progressively decreasing temperatures of between 125° and 65° C. for triple stage concentrators.

The crystals of the two salts thus obtained are sufficiently differentiated according to size, so much as to permit an efficient separation of the two fractions, for example by screening.

According to a preferred embodiment of the process according to the present invention, the size of sodium sulfate crystals can be more readily controlled and maintained essentially at the value desired differentiating in this way as much as is possible the sizes of the crystals of the two salts, by recycling part of the recovered sodium sulfate, which is finely ground, for example at 150–200 mesh, to the crystallizer, s that crystallization of the sodium sulfate takes place in the presence of many crystallization nuclei.

This recycling may be varied either in quantity or in fineness of grinding, and permits the recovery of sodium sulfate crystals of such dimension as to guarantee an excellent efficiency in the subsequent separation operation.

A mixture of sodium sulfate and ammonium sulfate crystals comes out of the concentrator-crystallizer system free of double salts and is sent to a subsequent separation operation of the two fractions. At that temperature the crystals are present within the brine of eutectic composition, and the ratio of crystals to brine may be varied within a wide range, for example, from between 10 and 80 percent in relation to the time utilized.

The separation of the two crystalline fractions can be carried out in various ways; according to a preferred method it is carried out by wet screening on high frequency vibrating screens, thermally isolated in order to afford the isothermicity that must be effected at a temperature higher than 60° C., the screen having a net with meshes varying between 20 and 50 mesh.

The top screening consists essentially of ammonium sulfate with a small percentage of sodium sulfate, and the under-screening consists of sodium sulfate impure because of the fine crystals of ammonium sulfate present therein, which fractions are treated separately, after concentrating by decantation and/or centrifugation, with water or with a fraction of starting solution in such quantity as to make pass into solution all of the salt present in each of the above fractions in lesser quantities. The top screening is preferably washed with a fraction of the starting solution on the screen itself, for example, in the last part of the net by spraying with part of the initial brine, always at a temperature higher than 60° C.

The crystalline fractions thus obtained pass to centrifugation and then to drying, eventually preceded by another washing with water.

In the process according to the present invention other suitable methods for separation of the two crystalline fractions coming from the crystallizer can be used by exploiting the various physical characteristics thereof (grading and/or specific gravity), for example dry screening or ventilation of the crystalline product after drying, smoothing, flotation in heavy liquids, etc.

To illustrate further the present invention and the advantages thereof the following specific examples are given, it being understood that these are merely intended to be illustrative and not limitative.

EXAMPLE 1

With reference to the enclosed drawing 1, 100 Kg. of brine, having the following percentage by weight composition:
- 27% $(NH_4)_2SO_4$
- 11% $Na_2SO_4$
- 62% $H_2O$ is subdivided into 3 fractions:
a. 30 Kg.  b. 50 Kg.  c. 20 Kg.

of which (c) is directly fed into a concentrator-crystallizer A operating at 80° C. This apparatus, provided with an external heat exchanger and a circulation pump, receives also the fractions (a) and (b) after these have been through definite washing operations in a more advanced cycle stage, as described, infra (respectively fractions h and 1+0). The water evaporation, which takes place through boiling in the crystallizer, leads to the formation of ammonium sulfate crystals of an average size of about 20 mesh, and sodium sulfate crystals of sizes about 100 mesh. The crystals are present within the eutectic composition brine at 80° C. and the ratio of crystals/brine is equal to about 32 percent.

Consequently, from the crystallizer come (d):
- 36.6 Kg. $(NH_4)_2SO_4$
- 15 Kg. $Na_2SO_4$
- 160 Kg. brine which are sent to the screening (b).

The screening gives use to two fractions, which are designated top screening (e) and underscreening (f).

The top screening consists of:
- 30.6 Kg. $(NH_4)_2SO_4$
- 1.4 Kg. $Na_2SO_4$
- 3.3 Kg. brine and is washed in C by mixing with the fraction (a) of the starting brine, at 80° C. In this manner all the sodium sulfate and part of the ammonium sulfate pass into solution. Therefore, one will have at final washing (g):
- 27 Kg. $(NH_4)_2SO_4$
- 38.3 Kg. brine The brine (h) is extracted by means of centrifugation in D and is recycled to the crystallization. The crystalline wet ammonium sulfate (i) passes to drying (E).

The underscreening, which consists of:
- 13.6 Kg. $Na_2SO_4$
- 6 Kg. $(NH_4)_2SO_4$
- 156.7 Kg. brine is concentrated by decantation isothermically at 80° C. in F overflowing (1) 136 Kg. of brine that it recycles to crystallization.

The concentrated part m, consisting of:
- 13.6 Kg. $Na_2SO_4$
- 6 Kg. $(NH_4)_2SO_4$
- 20.7 Kg. brine is washed in G with the fraction b) of starting brine (50 Kg) at 80°C.

With this operation, all the ammonium sulfate and part of the sodium sulfate are dissolved. At final washing one has (n):
- 11 Kg. $Na_2SO_4$
- 79.3 Kg. brine The brine (o), separated by centrifugation in H, is recycled to crystallization and the sodium sulfate (p) is dried in I.

EXAMPLE 2

With reference to the enclosed drawing 2, 100 Kg. brine having the following percentage by weight composition:
- 15% $(NH_4)_2SO_4$
- 15% $Na_2SO_4$
- 70% $H_2O$ is subdivised into 3 fractions:
a. 40 Kg.  b. 40 Kg.  c. 20 Kg.

The fraction (c) enters directly into the (1) stage of triple stage evaporation/crystallization plant (A) whereas the (a) and the (b) enter respectively into the (1) and into the (2) stage after these have been through definite washing operations, which will be described, infra.

From the (3) stage of the crystallization plant, which works at a temperature of 70° C., comes a eutectic (d) crystals/brine mixture, so constituted:
- 28.4 Kg. $(NH_4)_2SO_4$
- 22 Kg. $Na_2SO_4$
- 170 Kg. brine The grading of the $Na_2SO_4$ crystals is controlled by partly recycling to the evaporator/crystallizer system sodium sulfate finely ground by wet working on a ball mill. The recycle consists of 3.6 Kg. of $Na_2SO_4$ ground to 200 mesh. The mixture of crystals/solution which left the 3° stage feeds to a vibrating screen at high frequency (B) and at 70° C. and which is fitted with a net of 42 mesh.

Upon the net is sprayed the washing brine (a) (40 Kg.). The top screening which one discharges from the apparatus consists of:
- 15 Kg. $(NH_4)_2SO_4$
- 1.5 Kg. brine The brine (f) separated by centrifugation in C is recycled to crystallization (1 stage) and the ammonium sulfate (g) passes to drying (D).

The underscreening (h) is so composed:
- 21.2 Kg. $Na_2SO_4$
- 4.2 Kg. $(NH_4)_2SO_4$
- 218.5 Kg. brine 170 Kg. brine (i) are overflown by decantation in E which recycles to the crystallization. The concentrated part (i) consists of:
- 21.2 Kg. $Na_2SO_4$
- 4.2 Kg. $(NH_4)_2SO_4$
- 48.5 Kg. brine A washing is carried out in F at 70° C. with the fraction (b) (40 Kg.) more other 7.8 Kg. brine (m) coming from the final washing of the sodium sulfate; in that manner the ammonium sulfate is dissolved completely with a part of the sodium sulfate.

After washing one has: (n)
- 20.4 kg. $Na_2SO_4$
- 101.3 brine

With a second concentration by decantation in G, 60 Kg. brine (o) recycles to the crystallization. The concentrated part, that is,
- 20.4 Kg. $Na_2SO_4$
- 41.3 Kg. brine in part (p) (3.6 Kg. $Na_2SO_4$ + 7.3 lKg. brine) is treated in a small ball mill (H) and is recycled to the crystallization. The remaining part (q):
- 16.8 Kg. $Na_2SO_4$
- 34 Kg. brine is centrifuges in I. From the centrifuge are discharged 33 Kg. brine (r) which recycle to the crystallization and (s)
- 16.8 Kg. $Na_2SO_4$
- 1 Kg. brine which are subjected to a second washing in L with 6 Kg. $H_2O$ (t). This second washing is carried out in the presence of a saturated solution of sodium sulfate at 70° C.

After the washing there remain (u):
- 15 Kg. $Na_2SO_4$ which separated by centrifugation (M) from the brine (m) that recycles, pass to drying in (v).

EXAMPLE 3

100 Kg. of brine having the following percentage by weight composition;
- 28.4% $(NH_4)_2SO_4$
- 11.8% $Na_2SO_4$
- 60% $H_2O$ are subdivised in three fractions:

a. 34.4 Kg.  b. 55.6 Kg.  c. 10 Kg.
of which (c) enters directly into the first stage of a triple stage evaporation/crystallization plant. The fractions (a) and (b) enter respectively into the first and into the second stage after these have been through definite washing operations, as described, infra.

From the third stage of the crystallization plant, in which, with opportune vacuum grade, a brine of eutectic composition comprising ammonium sulfate and sodium sulfate crystals boils at 65° c., come out:

45.4 Kg. $(NH_4)_2SO_4$
19.8 Kg. $Na_2SO_4$
195.5 Kg. brine

The crystalline ammonium sulfate dispersed in the brine has an average size of about 33 mesh, whereas the sodium sulfate crystals have an average size of about 100 mesh.

All this is sent to the screening.

The screen vibrating at high frequency, is thermically isolated to effect isothermicity of operation (65° C.), and is provided with a net of 42 mesh.

The screening produces two fractions, top screening and underscreening.

The top screening consisting of:

36.3 Kg. $(NH_4)_2SO_4$
1.91 Kg. $Na_2SO_4$
9.50 Kg. brine is washed with the fraction (a) (34.4 Kg.) of fresh brine at a temperature of 85° C. The sodium sulfate is completely dissolved, as well as is part of the ammonium sulfate, therefore, upon final washing one has:

27.31 Kg. $(NH_{42}SO_4$
54.8 Kg. brine

The brine, separated by centrifugation, recycles to the crystallization, whereas the ammonium sulfate is dried and is ready for use.

The underscreening, which consists of:

17.9 Kg. $Na_2SO_4$
9.1 Kg. $(NH_4)_2SO_4$
186 Kg. brine is isothermically concentrated by decantation at 65° C., overflowing 156 Kg. of brine which is recycled to the crystallization.

The concentrated part consisting of:

17.9 Kg. $Na_2SO_4$
9.1 Kg. $(NH_4)_2SO_4$
30 Kg. brine is washed with the fraction (b) of fresh brine (55.6 Kg.) at 88° c. more other 7.60 Kg. of brine coming from a successive washing of the $Na_2SO_4$. The concentrated and washed underscreening is centrifuged.

The brine (106.47 Kg.) is recycled to crystallization, whereas the centrifugalated salt 13.03 Kg. $Na_2SO_4$
0.70 Kg. brine is washed with 5.87 Kg. $H_2O$.

Thence follows a second centrifugation, which supplies 7.60 Kg. of brine which recycles to the first washing of the underscreening and 11.4 Kg. $Na_2SO_4$
6.6 Kg. brine which is dried.

As many apparently widely different embodiments of this invention can be made without departing from the spirit and scope thereof, it is to be understood that this invention is not to be limited to the specific embodiments thereof except as defined in the appended claims.

What we claim is:

1. A process for the separation and recovery of both pure sodium sulfate and pure ammonium sulfate from an aqueous solution containing the same, comprising:

a. introducing finely ground $Na_2SO_4$ seed crystals to said aqueous solution;
   b. concentrating said aqueous solution by evaporation at a temperature greater than about 60° C. to a point whereat they are contemporaneously crystallized out of a eutectic solution of sodium and ammonium sulfate separate crystals of ammonium sulfate sized at about 0.5 to 1 mm. and having a specific gravity of about 1.7 to 1.8 and crystals of sodium sulfate sized at less than about 0.3 mm. and having a specific gravity of about 2.7;
   c. separating said two salts and obtaining two fractions of crystals, a first fraction which essentially consists of a predominant amount of ammonium sulfate and a minor amount of sodium sulfate, and a second fraction which essentially consists of a predominant amount of sodium sulfate and a minor amount of ammonium sulfate;
   d. separately washing the respective fractions at a temperature greater than about 60° C., whereby for the said first fraction the sodium sulfate is wholly dissolved and the ammonium sulfate is but partially dissolved thus leaving only a portion of ammonium sulfate in pure, crystalline form, and further whereby for the said second fraction the ammonium sulfate is wholly dissolved and the sodium sulfate is but partially dissolved thus leaving only a portion of sodium sulfate in pure, crystalline form; and
   e. thence individually recovering the respective portions of pure, crystalline ammonium sulfate and pure crystalline sodium sulfate.

2. The process as defined by claim 1, wherein the washing is with water.

3. The process as defined by claim 1, wherein the washing is with an unsaturated aqueous solution of sodium sulfate and ammonium sulfate.

4. The process as defined by claim 1, wherein the washing is with a solution of the original brine.

5. The process as defined by claim 1, wherein the concentration-crystallization is conducted in a single stage at temperatures ranging between 65° C. and 100° C.

6. The process as defined by claim 1, wherein the concentration-crystallization is conducted in triple stage at temperatures progressively decreasing from 125° C. to 65° C.

7. The process as defined by claim 1, wherein the separation of stage (b) is effected by screening.

8. The process as defined by claim 1, wherein the $Na_2SO_4$ seed crystals of step (a) are introduced thereto by recycling a portion of the finely ground resultant sodium sulfate of step (e) to the concentrator-crystallizer.